(12) United States Patent
Mihaila et al.

(10) Patent No.: US 11,817,747 B2
(45) Date of Patent: *Nov. 14, 2023

(54) MAGNET STRUCTURE HAVING A PLURALITY OF INDIVIDUAL MAGNETS INTEGRATED INTO A MESH STRUCTURE

(71) Applicant: WHYLOT SAS, Cambes (FR)

(72) Inventors: Vasile Mihaila, Figeac (FR); Loic Mayeur, Saint Santin (FR); Huguette Tiegna, Figeac (FR); Romain Ravaud, Labastide-Murat (FR)

(73) Assignee: WHYLOT SAS, Cambes (FR)

( * ) Notice: Subject to any disclaimer, the term of this patent is extended or adjusted under 35 U.S.C. 154(b) by 44 days.

This patent is subject to a terminal disclaimer.

(21) Appl. No.: 17/587,318

(22) Filed: Jan. 28, 2022

(65) Prior Publication Data

US 2022/0158511 A1 May 19, 2022

Related U.S. Application Data

(63) Continuation of application No. 16/494,998, filed as application No. PCT/FR2018/000064 on Mar. 20, 2018, now Pat. No. 11,239,716.

(30) Foreign Application Priority Data

Mar. 22, 2017 (FR) .................................... 1700295
Sep. 11, 2017 (FR) .................................... 1700915

(51) Int. Cl.
*H02K 1/04* (2006.01)
*H02K 1/12* (2006.01)
(Continued)

(52) U.S. Cl.
CPC ......... *H02K 1/2798* (2022.01); *H01F 7/0221* (2013.01); *H01F 41/0253* (2013.01);
(Continued)

(58) Field of Classification Search
CPC .......... H02K 1/2798; H02K 1/02; H02K 1/04; H02K 1/12; H02K 1/27; H02K 1/28;
(Continued)

(56) References Cited

U.S. PATENT DOCUMENTS

| | | | |
|---|---|---|---|
| 11,239,716 B2* | 2/2022 | Mihaila | .................... H02K 1/04 |
| 2020/0091782 A1* | 3/2020 | Mihaila | .................. H02K 21/12 |
| 2022/0158511 A1* | 5/2022 | Mihaila | .................. H02K 15/12 |

* cited by examiner

*Primary Examiner* — John K Kim
(74) *Attorney, Agent, or Firm* — Crockett & Crockett, PC; K. David Crockett, Esq.; Niky Economy Syrengelas, Esq.

(57) ABSTRACT

A three-dimensional magnet structure (6) made up of a plurality of individual magnets (4), the magnet structure (6) having a thickness that forms its smallest dimension, the magnet structure (6) incorporating at least one mesh (5*a*) exhibiting mesh cells each one delimiting a housing (5) for a respective individual magnet (4), each housing (5) having internal dimensions just large enough to allow an individual magnet (4) to be inserted into it, the mesh cells being made from a fibre-reinforced insulating material, characterized in that a space is left between the housing (5) and the individual magnet (4), which space is filled with a fibre-reinforced resin, the magnet structure (6) comprising a non-conducting composite layer coating the individual magnets (4) and the mesh structure (5*a*).

14 Claims, 6 Drawing Sheets

(51) Int. Cl.
*H02K 1/27* (2022.01)
*H02K 1/28* (2006.01)
*H02K 3/46* (2006.01)
*H02K 5/04* (2006.01)
*H02K 15/03* (2006.01)
*H02K 15/12* (2006.01)
*H02K 16/04* (2006.01)
*H02K 21/12* (2006.01)
*H02K 21/24* (2006.01)
*H02K 41/03* (2006.01)
*H02K 1/2798* (2022.01)
*H01F 7/02* (2006.01)
*H02K 41/02* (2006.01)
*H02K 1/02* (2006.01)
*H01F 41/02* (2006.01)
*H02K 7/00* (2006.01)

(52) U.S. Cl.
CPC ............... *H02K 1/02* (2013.01); *H02K 1/04* (2013.01); *H02K 1/12* (2013.01); *H02K 1/27* (2013.01); *H02K 1/28* (2013.01); *H02K 3/46* (2013.01); *H02K 5/04* (2013.01); *H02K 15/03* (2013.01); *H02K 15/12* (2013.01); *H02K 16/04* (2013.01); *H02K 21/12* (2013.01); *H02K 21/24* (2013.01); *H02K 41/031* (2013.01); *H01F 7/021* (2013.01); *H02K 7/003* (2013.01)

(58) Field of Classification Search
CPC ............ H02K 3/46; H02K 5/04; H02K 15/03; H02K 15/12; H02K 16/04; H02K 21/12; H02K 21/24; H02K 41/031; H02K 7/003; H02K 2213/12; H01F 7/0221; H01F 41/0253; H01F 7/021
USPC ...................................................... 310/12.18
See application file for complete search history.

MAGNET STRUCTURE HAVING A PLURALITY OF INDIVIDUAL MAGNETS INTEGRATED INTO A MESH STRUCTURE

This application is a continuation of U.S. application Ser. No. 16/494,998 filed Sep. 17, 2019, which is a national stage application of PCT application PCT/FR2018/000064 filed Mar. 20, 2018, which claims priority to French Application 1700295 filed Mar. 22, 2017 and French Application 1700915 filed Sep. 11, 2017 the contents of which are incorporated herein by reference for all purposes.

FIELD OF THE INVENTIONS

The invention relates to a magnet structure with a plurality of individual magnets integrated into a mesh structure. The invention further relates to an electromagnetic actuator comprising one or more such magnet structures.

BACKGROUND OF THE INVENTIONS

This invention is advantageously but not restrictively applied to an electromagnetic actuator that delivers high power with a high speed of rotation of the rotor, which is achieved by the use of one or more magnet structures according to the invention. An electromagnetic actuator of this type can be used, for example, in a fully electric or hybrid automotive vehicle.

Advantageously but not restrictively, the actuator can be a rotary actuator that can comprise at least one motor bracketed by two stators, whereby these elements can be superimposed on one another and can be separated by at least one air gap on the same shaft.

In high-speed applications it is necessary to have not only a compact system made possible by the reduction of the weight and size of the electromagnetic actuator for optimal performance, but also very good mechanical strength of the part that is rotating or in translation, i.e. the rotor or the element in linear translation, to improve the reliability of the system.

In high-speed applications it is necessary to reduce losses for optimal performance. Miniaturization is an increasingly desirable objective in automotive applications. To achieve that, it is important to have a compact system made possible by the reduction of the weight and size of the actuator, but also very good mechanical strength of the part in displacement, to improve the reliability of the system.

For an electromagnetic actuator with axial flux, as a non-restrictive example of the present invention, the rotor comprises a body in the form of a disc that has two circular faces connected by a thickness, the disc being delimited between an outer ring and an inner periphery delimiting an empty space for a rotation shaft.

At least two permanent magnets are applied against at least one of the two circular faces of the body, which is called a support face. For a rotor with a single air gap designed to be associated with the stator, a single circular surface of the body carries magnets, while for a rotor with two air gaps with a respective stator it is the two faces that carry the magnets.

The magnets are each held on the face or their respective face by holding means, an interval being left between the at least two magnets on the same face.

For an electromagnetic actuator with a radial flux, the rotor comprises a cylindrical body, the entire circumference of which carries magnets.

With regard to the stator or each stator, they each carry winding elements comprising a tooth that carries a coil, the tooth being bordered on each of its sides by a notch, whereby a metal wire made of a metal that is a good conductor is wound around the tooth to form the coil.

When the single or multiple series of windings are supplied with electricity, the rotor which is attached to the output shaft of the motor is subjected to a torque originating from the magnetic field, whereby the magnetic flux created is an axial flux for an electromagnetic machine with an axial flux and a radial flux for a machine with a radial flux.

For a high-power motor, the rotor rotates at high speeds of rotation. The principal disadvantage of a motor with a high speed of rotation resides in the high probability of a detachment of the magnet or magnets from the rotor as well as the at least partial breaking of the rotor. The rotor of a motor of this type must therefore be capable of withstanding high speeds of rotation.

Prior art document US-A-2011/0285237 describes an axial air gap motor. The object of this prior art document is to simplify the steps in the fabrication of the rotor while preventing the permanent magnets carried by this rotor from being displaced or unscrewed during the assembly, installation and operation of the rotor. The magnets are housed in a one-piece structure made of a molded part that encloses the magnets.

The molded part has grooves separating the magnets into which ribs on a body of the rotor are introduced, which makes it possible to lock the molded part to prevent an axial displacement movement. A radial retention of the molded part is performed by internal and external concentric elements on the molded part.

The subject matter of this prior art document is therefore magnets that are housed in a molded part and it contains no teaching with regard to magnets that are separated from one another. Moreover, the ribs retain the magnets only by their action on the molded part, and therefore not by directly retaining the magnets in the rotor.

Prior art document EP-A-1 780 878 describes a three-dimensional magnet structure constituted by a plurality of individual magnets, whereby the magnet structure has a thickness that forms its smallest dimension, the structure includes at least one mesh structure that has mesh elements each defining a housing for a respective individual magnet, each housing has inside dimensions that are just sufficient to allow the introduction of an individual magnet into its interior and the mesh elements are made of fiber-reinforced insulating material.

However, a magnet structure of this type is not capable of withstanding high speeds of rotation when the magnet structure or structures are carried by a rotor.

Prior art document FR-A-2 996 378 describes a magnet structure comprising individual magnets. These individual magnets are adhesively bonded by resin without the interposition of any retention element between the individual magnets. An arrangement of this type could not withstand high speeds of rotation without losing magnets during rotation.

SUMMARY

The problem addressed by this invention is to design a magnet structure for an electromagnetic actuator that can withstand high working speeds while delivering a powerful magnetic field with an optimal retention of the magnets in their support.

For this purpose, this invention relates to a three-dimensional magnet structure constituted by a plurality of individual magnets, whereby the magnet structure has a thickness that forms its smallest dimension, the structure includes at least one mesh structure that has mesh elements, each of which defines a housing for a respective individual magnet, whereby each housing has inside dimensions that are just sufficient to allow the introduction of an individual magnet into its interior and the mesh elements are made of fiber-reinforced insulating material, characterized in that a space is left between the housing and the individual magnet which is filled by at least one fiber-reinforced resin, whereby the magnet structure comprises a layer of non-conducting composite material coating the individual magnets and the mesh structure.

The object of the present invention is to break down one or more of the magnets in a rotor of the prior art into a plurality of small magnets or micro-magnets. A large-dimension magnet is subject to losses by Foucault currents that are greater than its equivalent in small magnets or micro-magnets. The use of small magnets or micro-magnets therefore makes it possible to reduce these losses which are prejudicial to the operation of the rotor.

The composite coating of the magnet structure is preferred to be made of iron so as not to induce detent torque.

Moreover, its mechanical strength can be high and the coating can easily be applied, in particular by injection of the composite over an arrangement of individual magnets held in place in relation to one another by any means. A magnet structure protected by its coating in this manner can withstand high speeds of rotation and the individual magnets are held firmly in place because they are already in a mesh structure and are adhesively bonded by a layer of resin.

The rotor with magnets located in the cells of the present invention is designed to reduce the losses in the rotor with rigid fastening means that make it possible to retain the magnets and to reduce the effect of the axial or radial force and of the centrifugal force at very high speeds.

The cracking of a relatively large magnet is frequently the cause of a malfunction of an electromagnetic actuator. This invention prevents this damage by the presence of a plurality of individual magnets that are smaller than the magnet they are replacing.

The problem then arises of the detachment of an individual magnet from its housing. This problem is solved by the adhesive bonding method proposed by the present invention. The housing is designed to be as small as possible to properly hold the individual magnet and leaves a space between the individual magnets only sufficient for the injection of resin. The resin itself is reinforced with fibers so that it has reinforced mechanical retention properties.

The at least one mesh structure is advantageously in the form of a honeycomb and has housings with a hexagonal cross-section.

A honeycomb mesh structure is known to reinforce the strength of an element, in this case a magnet structure. The individual magnets are inserted in hexagonal housings that ensure their retention. The walls of the housings act as electrical insulators and the density of the housings in the magnet structure can be significantly increased. The honeycomb mesh structure can be made of fiber-reinforced electrically insulating composite material.

Each individual magnet is advantageously in the form of an elongated block that penetrates lengthwise into its associated housing and extends along the thickness of the mesh element, whereby the elongated block is cylindrical or in the form of a polyhedron with at least one flat longitudinal face and, when the at least one mesh structure is in the form of honeycomb, each block has a hexagonal longitudinal face.

The working surface of the magnet structure is the one that will be opposite the coils of the stator for a rotating or linear electric actuator and from which the magnetic field is emitted.

According to its most conventional definition, a polyhedron is a three-dimensional geometric shape having polygonal flat faces that intersect along straight-line segments that are called edges, for example a straight or oblique prism, a cube or a pyramid. In the framework of the present invention, it is preferable to have a polyhedron that has two opposite, plane and equal longitudinal polygonal surfaces connected by edges that are straight and parallel such as a hexagonal polyhedron, although the invention is not limited to this design, whereby a single longitudinal surface can be present, with a peak on the other extremity of the polyhedron.

This configuration makes it possible to have a magnet structure that has numerous blocks forming individual magnets. It has been determined that a structure with a plurality of individual magnets has a high magnetization capacity as well as high strength, whereby the magnet structure preferably has a layer of composite material for the coating of the individual magnets. A magnet structure of this type can form a magnet pole or be a complete magnet.

It is known that, to obtain a magnetic field of optimal intensity, the ideal volume of a magnet must approach that of a cube or a cylinder, the length of which is equal to the diameter. It is common knowledge that increasing the length of a magnet beyond that does not result in any increase in the magnetic field. However, the approach taken by the present invention runs contrary to this preconceived idea.

The length of an individual magnet is significantly longer than the diameter or a diagonal of its plane longitudinal face, which is not suggested by widespread practice to respond to the requirements for the mechanical strength of the structure.

According to the invention, it has been determined that a plurality of individual magnets in a structure results in a magnet structure that is stronger than an individual magnet of the same shape, while surprisingly increasing the magnetic field delivered by the structure.

The layer of composite material advantageously comprises reinforcing fibers such as glass fibers or fibers of plastic material.

The reinforcement fibers contribute to increasing the strength of the magnet structure and in particular the rigidity in response to flexing and buckling.

The magnet structure advantageously comprises a stack of two series of individual magnets, each with a respective mesh structure.

The two mesh structures are advantageously part of the same assembly, the mesh structures being arranged in relation to one another so that each individual magnet of the series is aligned in the direction of its length with a respective individual magnet of the other series placed end to end with it.

Each pair of two individual magnets of different series connected end to end by magnetic attraction behaves like a longer individual magnet.

Two mesh structures are advantageously separated with a layer of composite material placed between the two mesh structures.

This makes it possible to have a magnet structure that can have a working surface over two opposite faces of the structure, whereby this magnet structure can be used in an electrical machine on a rotor bracketed by two stators.

A single-layer or multi-layer material is advantageously introduced into a space between the housing and the individual magnet. This material can be a plastic, a composite or a metal coating material for the individual magnets such as nickel or copper. The material can have been deposited on the individual magnet prior to its introduction into the mesh structure, whereby it can for example be a coating material, or it can have the action of forming a rigid connection between the individual magnet and the mesh structure that holds it.

The invention further relates to a linear or rotating electrical actuator, characterized in that it comprises an individual magnet structure or a plurality of magnet structures, whereby the magnet structure or structures form a rectangular assembly or are part of a rotor that rotates around its center, and the magnet structures are arranged concentrically with respect to the rotor.

Advantageously, when the actuator is an actuator with an axial flux, the magnet structure forms an individual magnet that extends over the actuator.

Advantageously, when the actuator is an actuator with a radial flux, there are a plurality of magnet structures in the form of successive tiles forming alternating successive magnet poles, the magnet structures being housed in at least one support comprising branches, delimiting between them housings that each hold a respective magnet structure.

The at least one support is advantageously part of a rotor and is in a partly hollow disc shape comprising branches that extend essentially radially or are inclined in the radial direction of the rotor, whereby the at least one disc support is covered over at least one face by a covering disc as axial holding means for the consolidation of the rotor.

The binding band represents a radial holding means for the magnet structures, the branches are a tangential retention means in the plane of the rotor and the covering disc or discs are an axial retention means of the magnet structures.

In the prior art, it was necessary to provide axial retention means for the magnets because the covering discs could not withstand the heat emitted by the magnets. This was made possible by magnet structures composed of a plurality of individual magnets which emit less heat and allow the utilization of covering discs.

The rotor advantageously has a peripheral external rim forming its edge, a binding band being installed on the peripheral external rim and making it possible to retain the magnet structures.

Advantageously, at least two magnet structures essentially forming a rim are separated by a wall in the middle of the disc-shaped support.

The invention relates to a method for the fabrication of a magnet structure of this type, characterized in that it comprises the following steps:
 cutting, from a magnetized tile having a length, width and thickness forming three dimensions of the tile, of a plurality of individual magnets along the three dimensions of the magnetized tile,
 positioning and retention of individual magnets at a distance from one another by the introduction of each individual magnet in a respective associated housing of a mesh structure,
 adhesive bonding of each individual magnet by the introduction of a resin around the individual magnet in each housing,
 injection of a layer of composite around the mesh structure and individual magnets for their coating.

Advantageously, when the structure comprises two stacked series of individual magnets, the method comprises the step of holding the mesh structures of the two series at a distance from one another to inject a layer of composite between the two mesh structures, or the mesh structures each comprise a base, the base of one mesh structure being applied against the base of the other mesh structure, whereby the two bases have a thickness sufficient to separate the individual magnets of one series from the individual magnets of the other series.

BRIEF DESCRIPTION OF THE DRAWINGS

Additional characteristics, objectives and advantages of the present invention are described in greater detail below and with reference to the accompanying drawings which are provided merely by way of non-restricting examples and in which.

DETAILED DESCRIPTION OF THE INVENTIONS

The illustrations are presented by way of example and in no way restrict the invention. They constitute schematic representations intended to facilitate an understanding of the invention and are not necessarily drawings to scale of practical applications. In particular, the dimensions of the different parts are not representative of reality.

With reference to all the Figures and in particular to FIGS. 4, 5a, 5b, 6a and 6b, as well as to the other Figures for the reference numbers not indicated in these first Figures, this invention relates to a three-dimensional magnet structure 6 constituted by a plurality of individual magnets 4. The magnet structure 6 can be in the form of a tile having a width, length and thickness, the thickness forming the smallest dimension of the diamond structure 6.

Figure 1A:
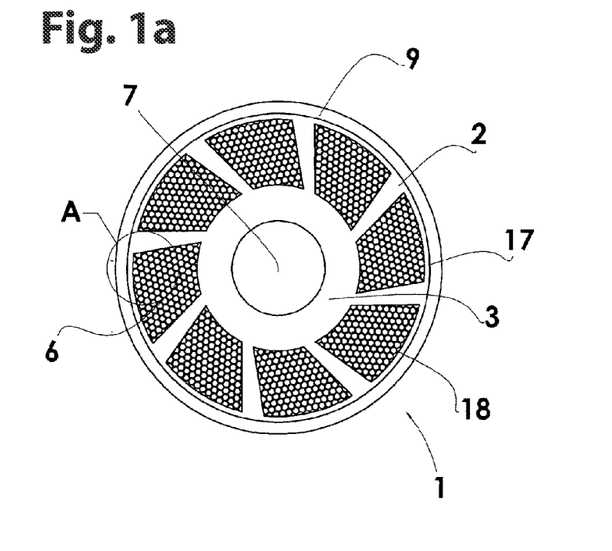
FIG. 1a is a schematic representation of a view of one face of a rotor intended for an electromagnetic actuator with an axial flux according to a first embodiment of the invention.
Figure 1B:
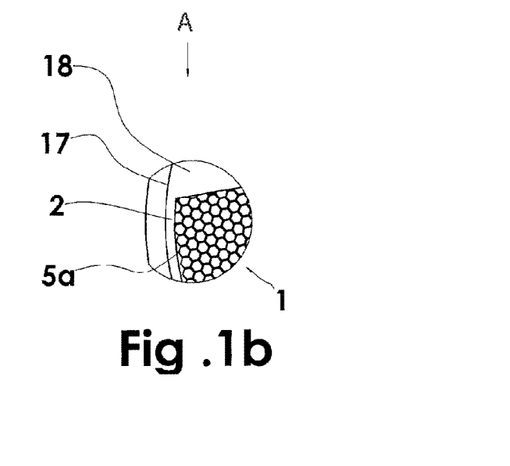
FIG. 1b is a schematic representation of an enlarged view of the circled part referenced A in FIG. 1a, FIGS. 1c and 1d are schematic representations of an enlarged view of the magnet structure composed of the mesh structure and individual magnets.
Figures 1C, 1D:
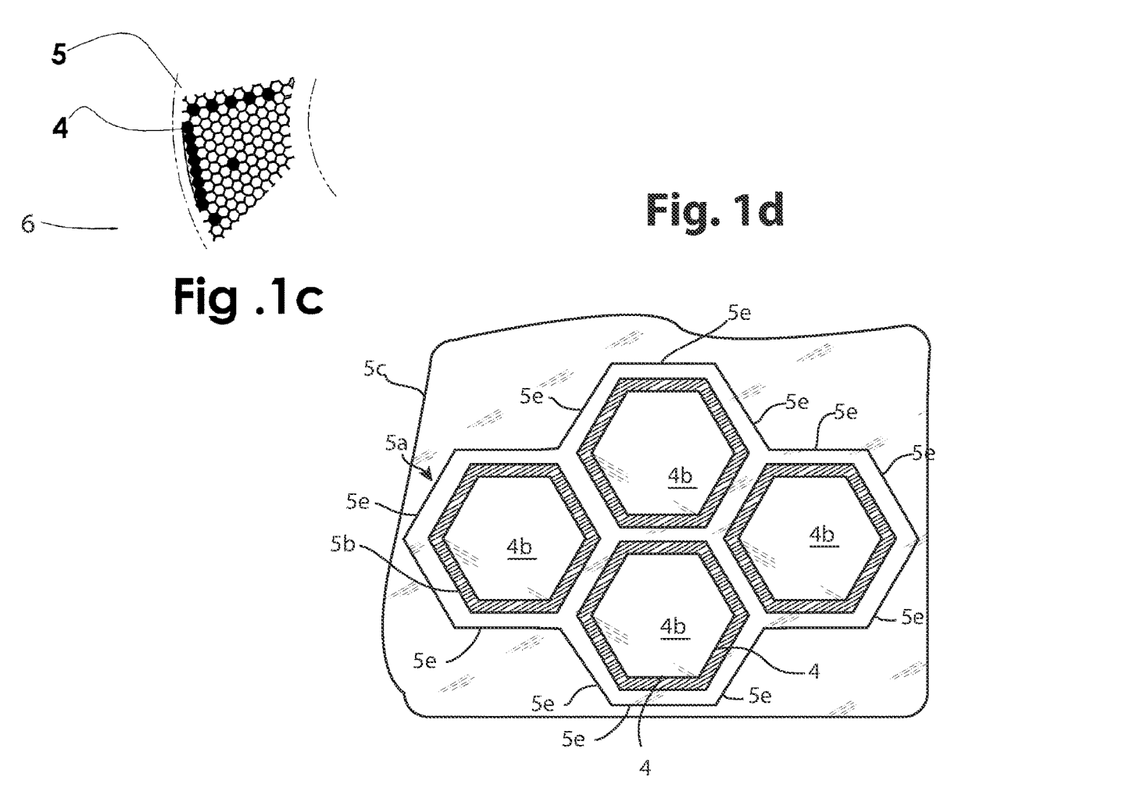

According to the invention, the magnet structure 6 integrates at least one mesh structure 5a that has mesh elements each delimiting a housing 5 or cell for a respective individual magnet 4. Each housing 5 can have inside dimensions that are just sufficient to allow the introduction of an individual magnet 4 into its interior, while leaving a space between the housing 5 and the individual magnet 4 filled by a fiber-reinforced resin, whereby the mesh structures are made of a fiber-reinforced insulating material, the space being kept as small as possible for a better enclosure of each individual magnet. FIG. 1d illustrates the coating 5c and filler 5b mentioned above, and shows the mesh structure 5a and the outer face 4b of several magnets disposed within the housings 5 (see FIG. 1c) of mesh structure 5a. The fiber-reinforced resin fill 5b is disposed between the magnets 4 and the elements 5e of the mesh structure. The layer of non-conducting composite material on the magnets and mesh structure is shown as item 5c.

This makes it possible to ensure the retention of the individual magnets 4 in their respective housings 5 even at a high speed of displacement, for example a high speed of rotation for one or more of the magnet structures 6 that make up part of a rotor 1, 1a, although the invention is not limited to this configuration.

The mesh structure 5a can be in the form of a honeycomb that has housings 5 that have a hexagonal cross-section. In this case, each individual magnet 4 can be in the form of an elongated block 4 that penetrates lengthwise into its associated housing 5 and extends along the thickness direction of the magnet structure 6.

Figure 4:
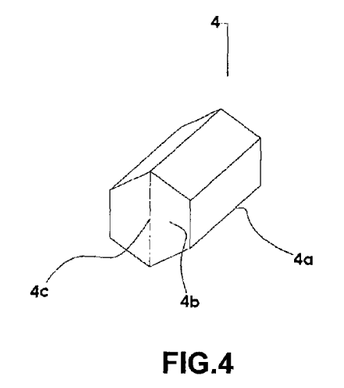
FIG. 4 is a schematic representation of a view and perspective of a block serving as an individual magnet in a magnet structure according to the present invention.

According to one preferred characteristic of the invention, each individual magnet 4 can be in the form of an elongated block 4, visible in particular in FIG. 4, having a length 4a that extends along the thickness of the magnet structure 6. The elongated block 4 can be cylindrical or in the shape of a polyhedron with at least one flat longitudinal face 4b oriented toward a work surface of the magnet structure 6 which is the surface facing the windings in a rotating or linear electromagnetic actuator. The length 4a of each block is greater than the diameter of the first longitudinal face for a cylindrical block, which is not shown in the Figures, or a longer diagonal line 4c connecting the apexes of this longitudinal face 4b for a block 4 in the shape of a polyhedron. For a rectangular face 4b such as a hexagon, all the diagonals 4c are equal.

For example, without this configuration being restrictive, the individual magnets 4 can be neodymium iron boron magnets or samarium cobalt magnets or any other type of magnet. The neodymium magnets are sensitive to impacts and to torsion and are highly flammable. By reducing their dimensions by division, this invention makes it possible to eliminate all these risks and in particular the risks of breakage of the magnets. The fact that they are retained in the cells also protects them.

When the mesh structure 5a is in the form of a honeycomb, each block 4 can have a hexagonally shaped longitudinal face 4b.

The magnet structure 6 can comprise a layer of non-conducting composite material coating the individual magnets 4 and the mesh structure 5a. The individual magnets 4 are therefore retained by the mesh structure 5a with the interposition of a fiber-reinforced resin between each individual magnet and the mesh element that holds it, and then by a layer of composite coating the assembly which confers optimal mechanical strength on a magnet structure 6. The entire contour of the magnet structure 6 can be delimited by this composite layer.

The individual magnet 4 can be coated with a single-layer or multi-layer material that may or may not contribute to its adherence to the interior of the mesh element in which it is housed.

The composite preferably does not contain iron so that it does not induce a detent torque or additional losses.

The layer of composite material can comprise reinforcing fibers such as glass fibers or fibers of plastic material. The layer of composite can comprise reinforcement fibers such as glass fibers or fibers made of plastic material, for example Kevlar or polyamide or any plastic material that increases the mechanical strength of the assembly.

The magnet structure 6 advantageously comprises a stack of two series of individual magnets 4, each with a respective mesh structure 5a.

Figures 6A, 6B:
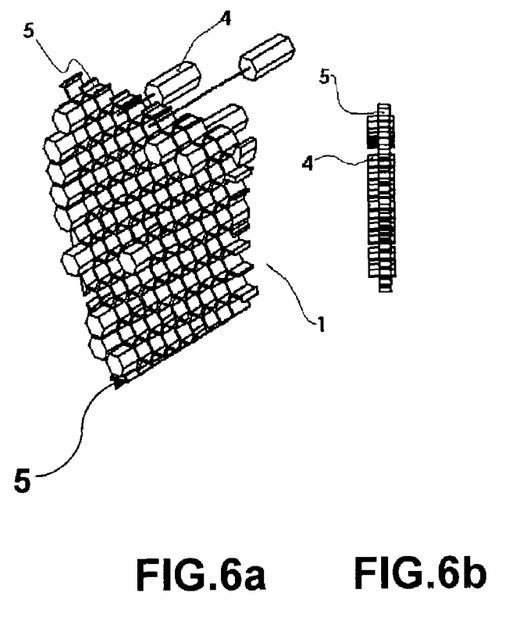
FIGS. 6a and 6b are schematic representations respectively of a perspective view and a side view of a honeycomb that can act as the mesh structure surrounding the blocks that form the individual magnets in a magnet structure according to this invention.

A mesh structure 5a isolated from the magnet structure 6 is illustrated in FIGS. 6a and 6b. The housings 5 or cells do not surround their associated block 4 over its entire length.

In the framework of one preferred embodiment of the invention, the composite coating layer, the mesh structure 5a surrounding the individual magnets 4 and the adhesive bonding means of the magnets in the housings 5 of the mesh structure 5a can all three be fiber-reinforced. The magnet structure 6 thereby obtained has very high rupture strength mechanical characteristics.

In a first preferred embodiment not illustrated in the Figures, the magnet structure 6 can comprise a stack of two series of individual magnets 4, each individual magnet 4 of one series being aligned in the direction of its length with a respective individual magnet 4 of the other series with which it is placed end to end. Each pair of two individual magnets 4 of different series connected end to end by magnetic attraction behaves like a longer individual magnet.

The two mesh structures 5a are advantageously part of the same assembly, the mesh structures 5a being arranged in relation to one another so that each individual magnet 4 of one series is aligned in the direction of its length with a respective individual magnet 4 of the other series with which it is placed end to end.

In a second preferred embodiment not illustrated in the Figures, the magnet structure 6 can comprise a stack of two series of a plurality of individual magnets 4, the two series being stacked one on the other and a layer of composite being interposed between the two stacked series. The two stacked series are thus electrically isolated from one another.

This makes it possible to have a magnet structure 6 that can have a working surface area over two opposite faces of the magnet structure 6, whereby this magnet structure 6 can be used, for example, in a rotating electromagnetic actuator for a rotor 1, 1a bracketed by two stators.

Figure 2A:
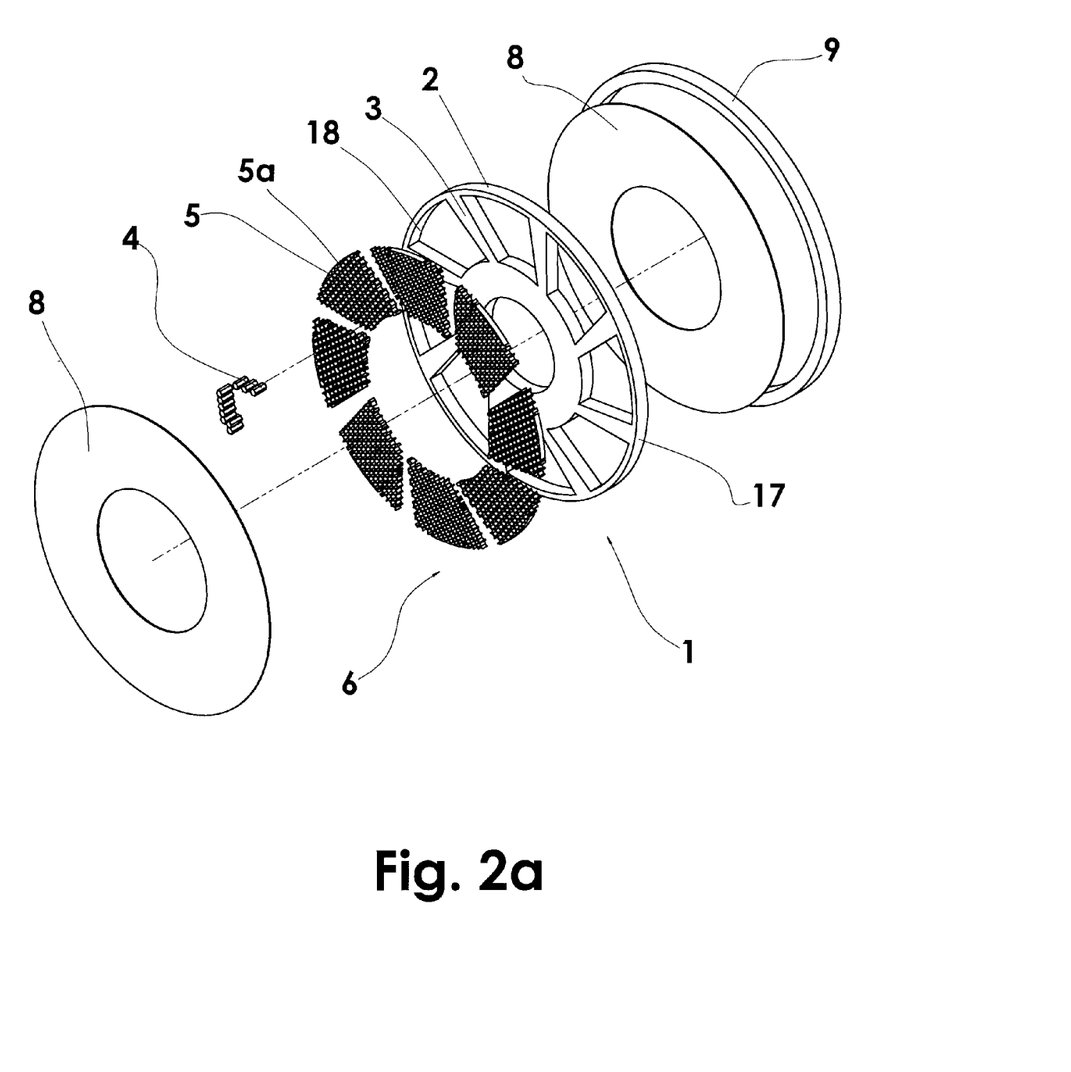
FIG. 2a is a schematic representation of an exploded view of a first embodiment according to the present invention of a rotor intended for an electromagnetic actuator with an axial flux.
Figure 2B:
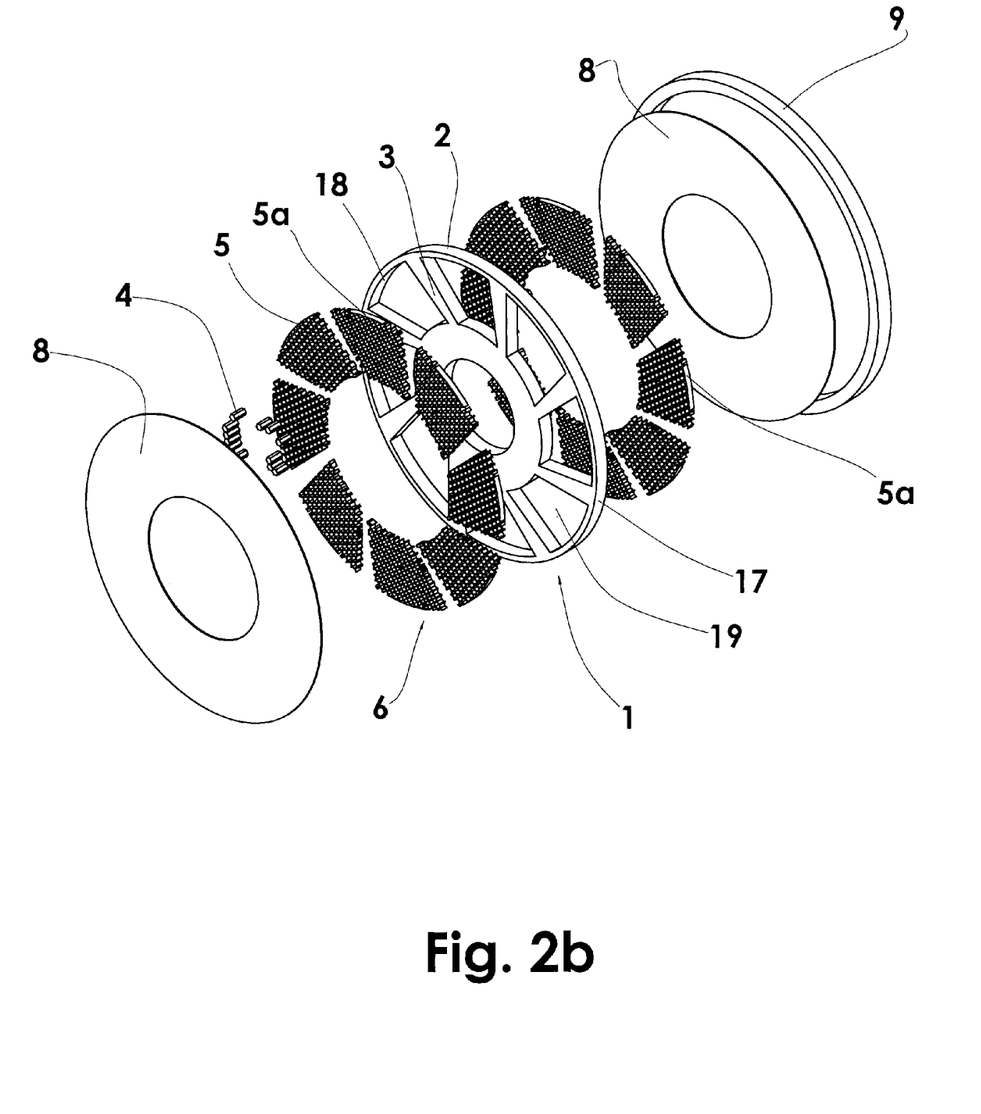
FIG. 2b is a schematic representation of an exploded view of a second embodiment according to the present invention of a rotor intended for an electromagnetic actuator with an axial flux.

In FIG. 2b, for example, the two series of individual magnets 4 of each magnet structure 6, only one of which is identified as 6 in this Figure, can form magnet structures 6 with two series of magnets coated in the same composite layer, one series being electrically isolated from the other series.

The invention also relates to a linear or rotating electromagnetic actuator. The actuator comprises an individual magnet structure 6 or a plurality of magnet structures 6 as described above. In this latter case, the magnet structures 6 are separated from one another by branches 3. The invention also relates to a linear or rotating electromagnetic actuator, although only a rotating electromagnetic actuator is illustrated in FIGS. 1a, 2a. This actuator can be an actuator with a radial flux, an axial flux or a combination of the two.

The magnet structure or structures 6 can form a rectangular assembly for a linear actuator, whereby the magnet structures 6 are aligned one after another. The magnet structures 6 can be part of a rotor 1, 1a, rotating around its center for a rotating actuator, in which case the magnet structure or structures 6 are oriented concentrically with respect to the rotor 1, 1a.

The rotor 1, 1a for a rotating electromagnetic actuator or the translation support for a linear actuator can also be made of a fiber-reinforced composite material.

Figures 5A, 5B:
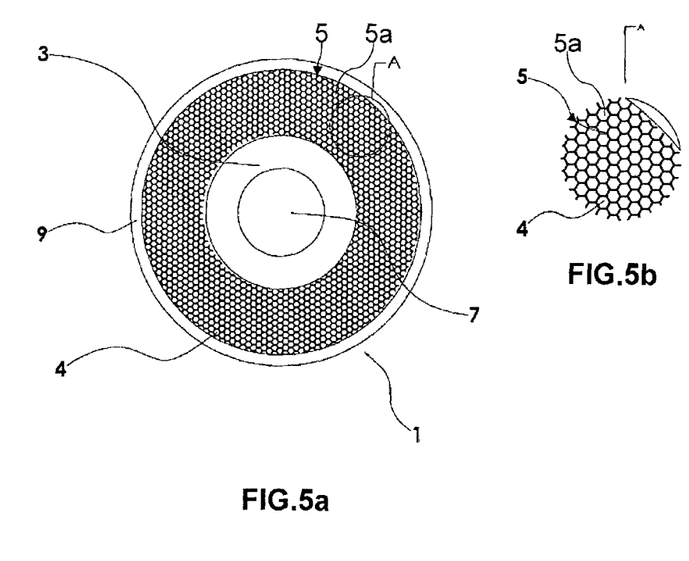
FIGS. 5a and 5b are schematic representations of plan views respectively of a magnet structure forming an individual magnet and an enlarged view of a portion of this magnet structure.

When there is an individual magnet structure, the magnet structure 6 can form an individual magnet extending over the actuator. This is shown in FIG. 5a. When there are a plurality of magnet structures, the magnet structures 6 are successive tiles that form alternating successive magnet poles. This is shown in particular in FIG. 2a.

The invention relates to a method for the fabrication of a magnet structure 6 of the type described above. The fabrication method comprises a first step of cutting, from a magnetized tile, a length, width and thickness that form the three dimensions of the tile. The cutting results in a plurality of individual magnets 4 in the three dimensions of the magnetized tile.

The second step relates to the positioning and holding of individual magnets 4 at a distance from one another by the introduction of each individual magnet 4 in a respective associated housing 5 of a cylindrical mesh structure 5a.

The third step relates to the adhesive bonding of each individual magnet 4 in the form of the introduction of a resin around the individual magnet 4 in each housing 5.

The fourth step relates to the injection of a layer of composite around the mesh structure 5a and the individual magnets 4 to coat them.

Advantageously, when the magnet structure 6 comprises two stacked a series of individual magnets 4, the method comprises the step of holding the mesh structures 5a of the two series at a distance from each other to inject a layer of composite between the two mesh structures 5a and to isolate the individual magnets of one series from the individual magnets of the other series.

Alternatively, the mesh structures 5a can each comprise a base, whereby the base of one mesh structure 5a is applied against the base of the other mesh structure 5a, the two bases having a sufficient thickness to separate the individual magnets 4 of one series from the individual magnets 4 of the other series.

With reference to FIGS. 1a to 1c, 2a, 2b and 3, the Figures show a rotor 1, 1a of an electromagnetic actuator having at least one support 2, 2a housing a plurality of individual magnets 4. For example, there can be a support 2, 2a on each side of the rotor or in the interior of the rotor, depending on whether the rotor is a rotor with an axial flux or a radial flux.

This at least one support 2, 2a comprises branches 3, 3a which between them delimit cavities, each of which holds a respective magnet structure 6 that can be composed of a mesh structure 5a comprising housings or cells 5 and individual magnets 4, each individual magnet 4 being inserted into a respective housing or cell 5, whereby the magnet structure 6 forms a magnet pole or a whole magnet. FIGS. 1c shows a view on a larger scale than FIG. 1a of a magnet structure 6 of this type.

The objective of the present invention is to replace one or more large magnets with a plurality of small individual magnets 4. To accomplish that, a magnetic flux is created by a multitude of small individual magnets 4, the number of which is at least 20 and can be greater than 100 or even significantly more, per magnet structure 6.

A rotor of the prior art can comprise from 1 to 5 magnets while the present invention provides many more small individual magnets 4. The small individual magnets 4 according to the present invention can be inserted into the respective cells 5 by a robot. For a medium-size rotor, the small magnets 4 in the framework of the present invention can have a dimension of 4 mm.

In a first preferred embodiment of the invention, the rotor is a rotor with a radial flux, and is therefore intended for use in a motor or generator with a radial flux. In this embodiment, the at least one support 2a is cylindrical and comprises branches 3a.

Figure 3:
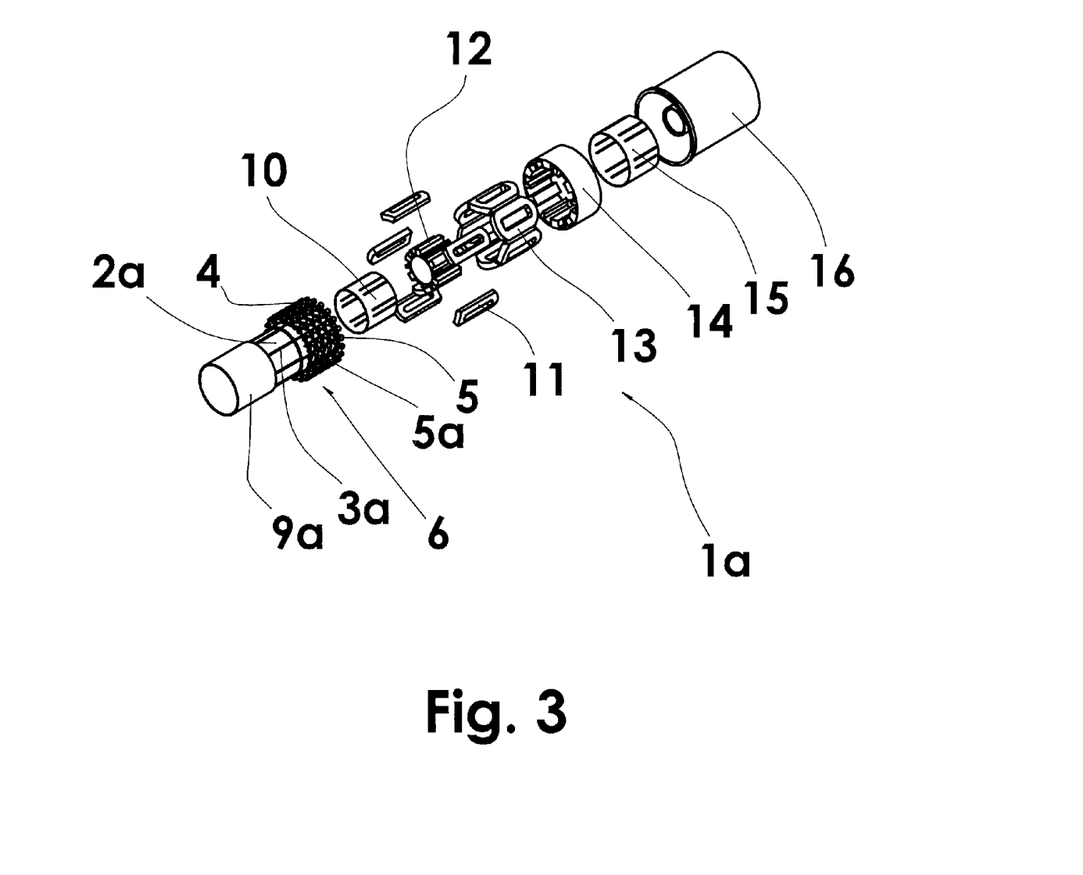
FIG. 3 is a schematic representation of an exploded view of one embodiment according to the present invention of an electromagnetic actuator with a radial flux.

In the embodiment illustrated in FIG. 3, which shows an electromagnetic actuator with a radial flux with two stators and one rotor 1a, the cylindrical rotor 1a with a radial flux has a cylindrical support 2a that can have separation branches 3a which can extend axially over the cylindrical support 2a. The separation branches 3a axially delimit the magnet structures 6 composed of the mesh structure 5a and the individual magnets 4. The cylindrical support 2a can be hollowed out between the separation branches 3a to hold magnet structures 6 composed of the cellular mesh structure 5a and the individual magnets 4.

A binding band 9a covers one extremity of the rotor 1a in proximity to the cylindrical support 2a. Inserted into the interior of the cylindrical support 2a is an inside covering cylinder 10 and an exterior covering cylinder 15 extends over the outside of the cylindrical support 2a on the external periphery of the cylindrical support 2a.

A first stator is located in the interior of the rotor 1a and has an internal magnetic circuit 12 that carries coils 11. The interior covering 10 covers the internal magnetic circuit 12.

A second stator is located on the outside of the rotor 1 a surrounding it and has an external magnetic circuit 14 that includes coils 13 in its interior. The outside covering 15 is located between the coils 13 and the external magnetic circuit 14. A casing 16 covers the assembly of the rotor 1a and the two stators.

In another embodiment not illustrated in FIG. 3, the branches can be in the form of rings spaced one after another in the axial direction of the cylindrical support. The successive branches can project radially on the periphery of the at least one support. The at least one cylindrical support can be hollowed out so that it has, between two successive branches, a housing to hold a unit composed of the cellular structure and the magnets.

The magnet structures 6 composed of the mesh structure 5a and the individual magnets 4 used for a cylindrical support can each be in the form of a closed ring or tiles located at some distance from one another. Otherwise, the arrangement of the stators and optional covering cylinders or binding band in the radial flux actuator according to this other embodiment can be similar to that shown in FIG. 3. This other embodiment is not preferred.

In a second preferred embodiment of the invention, the rotor is a rotor with an axial flux and is therefore intended for use in a motor or generator with an axial flux. In this embodiment, the at least one support 2, 2a is in the form of a disc and is partly hollow comprising branches 3, 3a that extend essentially radially or at an inclination in the radial direction between an internal circumference 18 that internally delimits a passage for a rotation shaft of the rotor 1, and an external ring 17 of the support 2 forming the external ring of the support 2. This is shown in FIGS. 1a, 1b, 2a and 2b.

The branches 3, 3a can be inclined in relation to the rotation shaft of the rotor as if they were screw blades and have a width that increases with the distance from the center of the support.

The external periphery can have edges that are curved radially toward the interior of the support 2 to form axial stops for the end portions of magnet structures 6 composed of the cellular mesh structure 5a and the individual magnets 4 introduced into the external periphery 17.

In the second embodiment, the at least one disc-shaped support 2a can be covered on at least one face by a covering disc 8 as axial holding means for the consolidation of the rotor. This can be done on the two opposite faces by a respective covering disc 8. A covering disc 8 of this type can be made of composite material and serves as an axial retention means for the individual magnets 4.

In the second embodiment, the rotor 1, 1a can have a peripheral external ring forming its edge, whereby a binding band 9 is installed on the peripheral external ring 17 making it possible to retain the individual magnets 4 against a centrifugal force.

In the second embodiment, each magnet structure 6 composed of the mesh structure 5a and the individual magnets 4 can comprise housings or cells 5 that may or may not extend all the way through each face of the disc-shaped support 2a. Each of the individual magnets 4 housed in a respective housing or cell 5 can therefore emerge on each face from the disc-shaped support 2a.

FIG. 2a shows the separation branches 3 of two adjacent units.

As shown in FIG. 2b, at least two magnet structures 6 composed of a mesh structure 5a and individual magnets 4 essentially forming a ring can be separated by a wall 19 in the middle of the disc-shaped support 2. The magnet structures 6 can be one-piece discs or separated by the branches 3a.

The following description can apply to both preferred embodiments of the present invention.

The magnet structures 6, each composed of the mesh structure 5a and individual magnets 4, can be rigidly fastened to the at least one support 2, 2a by fastening means based on ferrous materials, synthetic materials or composite materials.

The rigid fastening means can be an integral part of the rotor and/or can be additional parts attached to the rotor. The additional parts can be welded, bolted, riveted or snapped onto the rotor 1, 1a. It is possible to provide rigid fastening means between each individual magnet 4 and the housing or cell 5 that holds it, with the fastening means on the internal face of the housing or cell 5 of the separation walls 19 that delimit the cell in relation to the adjacent housings or cells 5.

In each magnet structure 6 composed of the cellular mesh structure 5a and the individual magnets 4, the housings or cells 5 can be delimited by separation walls 19, each individual magnet 4 being permanently installed in its respective housing or cell 5 by resin, adhesive bonding or welding.

The individual magnets 4 and their respective housings or cells 5 can be of variable shapes with their poles oriented in parallel or diverging directions. For example, the dimensions of the housings or cells 5 can differ from one housing or cell 5 to another. The housings or cells 5 do not absolutely have to be in the shape of a hexagon, although that is a preferred shape.

The electromagnetic actuator can comprise at least one stator that carries at least one winding including one or more air gaps between the at least one rotor and the at least one stator, of one or more stators that carry the winding.

Each stator can comprise a magnetic circuit associated with a winding. The stator can have open or closed teeth or notches. A casing makes it possible to protect the motor or the electromagnetic generator when it is used as an actuator. The stators can be connected in series or in parallel. The offset of one stator from another by an angle, combined with the shape of the notches in the shape of the individual magnets 4, makes it possible to reduce the torque variation and the detent torque.

The actuator can be an electromagnetic motor or generator and can function at very high speeds with or without a speed step-up gear. The motor or the generator can comprise at least two stators connected in series or in parallel or at least two rotors.

The rotor can comprise a rotation shaft that extends perpendicular to the circular faces of the rotor 1, 1a and traverses the two stators. The rotor 1, 1a can be carried by at least two roller bearings, with one roller bearing associated with a respective stator to allow it to rotate with reference to the stators.

The invention claimed is:

1. A rotating electromagnetic actuator having a three-dimensional magnet structure (6) comprising:
   a plurality of individual magnets (4);
   at least one mesh structure (5a), with mesh cells, each mesh cell including a housing (5) for a respective individual magnet (4), each housing (5) having inside dimensions that are sized to fit an individual magnet into its interior, the mesh cells being made from a fiber-reinforced insulating material, characterized in that a space is defined between the housing (5) and the individual magnet (4), wherein the space is filled by at least a fiber-reinforced resin; and
   a non-conducting composite layer coating the individual magnets (4) and the mesh structure (5a), the magnet structure or structures (6) forming a rectangular assembly or being part of a rotor (1, 1a) that rotates around its center, the magnet structure or structures (6) being arranged concentrically with respect to the rotor (1, 1a) whereby the rotating electromagnetic actuator is an axial flux actuator, the magnet structure (6) forms a single magnet extending over the rotating electromagnetic actuator;
   wherein the magnet structure comprises a stack of two series of individual magnets (4), each with a respective mesh structure (5a);
   wherein within the magnet structure the two mesh structures (5a) are advantageously part of the same assembly, the mesh structures (5a) being arranged in relation to one another so that each individual magnet (4) of one series is aligned in the direction of its length with a respective individual magnet (4) of the other series with which it is placed end to end;
   wherein within the magnet structure the two mesh structures (5a) are separated with a layer of composite interposed between the two mesh structures (5a); and
   and wherein within the magnet structure the layer of composite comprises reinforcement fibers such as glass fibers or fibers of plastic material.

2. The rotating electromagnetic actuator of claim 1, wherein the magnet structure in which the at least one mesh structure (5a) is in the form of a honeycomb that has housings (5) with a hexagonal cross section.

3. The rotating electromagnetic actuator of claim 1, wherein within the magnet structure each individual magnet is advantageously in the form of an elongated block (4) that penetrates lengthwise into its associated housing (5), the elongated block (4) being cylindrical or in the form of a polyhedron with at least one flat longitudinal face (4b) and, when the at least one mesh structure (5a) is in the form of honeycomb, each block (4) has a hexagonal longitudinal face (4b).

4. The rotating electromagnetic actuator of claim 1, wherein within the magnet structure a single-layer or multi-layer material is introduced into the space between the housing (5) and the individual magnet (4).

5. A rotating electromagnetic actuator having a three-dimensional magnet structure (6) comprising:
a plurality of individual magnets (4);
at least one mesh structure (5a), with mesh cells each mesh cell including a housing (5) for a respective individual magnet (4), each housing (5) having inside dimensions that are sized to fit an individual magnet into its interior, the mesh cells being made from a fiber-reinforced insulating material, characterized in that a space is defined between the housing (5) and the individual magnet (4), wherein the space is filled by at least a fiber-reinforced resin; and
a non-conducting composite layer coating the individual magnets (4) and the mesh structure (5a), the magnet structure or structures (6) forming a rectangular assembly or being part of a rotor (1, 1a) that rotates around its center, the magnet structure or structures (6) being arranged concentrically with respect to the rotor (1, 1a) whereby the linear or rotating electromagnetic actuator is an axial flux actuator, the magnet structure (6) forms a single magnet extending over the linear or rotating electromagnetic actuator;
wherein the at least one support (2, 2a) is part of the rotor (1) and is in a partly hollow disc shape comprising branches (3) that extend essentially radially or are inclined in the radial direction of the rotor (1), the at least one disc-shaped support (2) being covered over at least one face by a covering disc (8) as axial holding means for the consolidation of the rotor (1), and
wherein the rotor (1) has an outer peripheral ring (17) forming its edge, a binding band (9) being installed on the peripheral outer ring (17) making it possible to retain the magnet structures (6).

6. A rotating electromagnetic actuator having a three-dimensional magnet structure (6) comprising:
a plurality of individual magnets (4);
at least one mesh structure (5a), with mesh cells, each mesh cell including a housing (5) for a respective individual magnet (4), each housing (5) having inside dimensions that are sized to fit an individual magnet into its interior, the mesh cells being made from a fiber-reinforced insulating material, wherein a space is defined between the housing (5) and the individual magnet (4), wherein the space is filled by at least a fiber-reinforced resin; and
a non-conducting composite layer coating the individual magnets (4) and the mesh structure (5a), the magnet structure or structures (6) forming a rectangular assembly or being part of a rotor (1, 1a) that rotates around its center, the magnet structure or structures (6) being arranged concentrically with respect to the rotor (1, 1a) whereby the actuator is an axial flux actuator, there are a plurality of magnet structures (6) in the form of successive tiles forming alternating successive magnet poles, the magnet structures (6) being housed in at least one support (2, 2a) comprising branches (3, 3a), delimiting between them housings that each hold a respective magnet structure (6),
wherein the magnet structure in which the at least one mesh structure (5a) is in the form of a honeycomb that has housings (5) with a hexagonal cross section, and wherein within the magnet structure each individual magnet is in the form of an elongated block (4) that penetrates lengthwise into its associated housing (5), the elongated block (4) being cylindrical or in the form of a polyhedron with at least one flat longitudinal face (4b) and each block (4) has a hexagonal longitudinal face (4b).

7. The rotating electromagnetic actuator of claim 6, wherein within the magnet structure the layer of composite comprises reinforcement fibers such as glass fibers or fibers of plastic material.

8. The rotating electromagnetic actuator of claim 6, wherein the magnet structure comprises a stack of two series of individual magnets (4), each with a respective mesh structure (5a).

9. The rotating electromagnetic actuator of claim 8, wherein within the magnet structure the two mesh structures (5a) are part of the same assembly, the mesh structures (5a) being arranged in relation to one another so that each individual magnet (4) of one series is aligned in the direction of its length with a respective individual magnet (4) of the other series with which it is placed end to end.

10. The rotating electromagnetic actuator of claim 9, wherein within the magnet structure the two mesh structures (5a) are separated with a layer of composite interposed between the two mesh structures (5a).

11. The rotating electromagnetic actuator of claim 10, wherein within the magnet structure a single-layer or multi-layer material is introduced into the space between the housing (5) and the individual magnet (4).

12. The rotating electromagnetic actuator of claim 6, in which the at least one support (2, 2a) is part of a rotor (1) and is in a partly hollow disc shape comprising branches (3) that extend essentially radially or are inclined in the radial direction of the rotor (1), the at least one disc-shaped support (2) being covered over at least one face by a covering disc (8) as axial holding means for the consolidation of the rotor (1).

13. The rotating electromagnetic actuator of claim 12, in which the rotor (1) has an outer peripheral ring (17) forming its edge, a binding band (9) being installed on the peripheral outer ring (17) making it possible to retain the magnet structures (6).

14. The rotating electromagnetic actuator of claim 6, in which at least two magnet structures (6) essentially forming a ring are separated by a wall (19) in the middle of the disc-shaped support (2).

* * * * *